(12) United States Patent
Singhal

(10) Patent No.: US 9,213,477 B2
(45) Date of Patent: Dec. 15, 2015

(54) APPARATUS AND METHOD FOR TOUCH SCREEN USER INTERFACE FOR HANDHELD ELECTRIC DEVICES PART II

(76) Inventor: Tara Chand Singhal, Torrance, CA (US)

( * ) Notice: Subject to any disclaimer, the term of this patent is extended or adjusted under 35 U.S.C. 154(b) by 1347 days.

(21) Appl. No.: 12/456,009

(22) Filed: Jun. 10, 2009

(65) Prior Publication Data

US 2010/0253620 A1   Oct. 7, 2010

Related U.S. Application Data

(60) Provisional application No. 61/212,095, filed on Apr. 7, 2009.

(51) Int. Cl.
  *G06F 3/0488* (2013.01)
  *H04M 1/725* (2006.01)

(52) U.S. Cl.
  CPC .......... *G06F 3/0488* (2013.01); *H04M 1/72583* (2013.01); *H04M 2250/22* (2013.01)

(58) Field of Classification Search
  CPC ........................................ G06F 3/041–3/04897
  USPC .................... 178/18.01–19.07; 345/173–178; 715/700–866
  See application file for complete search history.

(56) References Cited

U.S. PATENT DOCUMENTS

| 6,639,584 B1* | 10/2003 | Li ................................. 345/173 |
| 6,727,930 B2* | 4/2004 | Currans et al. ................ 715/864 |
| 2004/0135823 A1* | 7/2004 | Wingett et al. ............... 345/856 |

* cited by examiner

*Primary Examiner* — Michael Pervan
(74) *Attorney, Agent, or Firm* — Steve Roeder, Esq.

(57) ABSTRACT

A system of touch screen user interface in a touch screen equipped handheld electronic device has a bounded control area on a touch screen that is used for touch control in lieu of the entire touch screen surface. The control area is able to provide touch control user interface functions of scroll, zoom, action item selection, and other control functions. The control area may be minimized enabling the entire touch screen to resume its touch screen control function in lieu of the control area control and maximized enabling only the bounded control area to be used for touch screen control depending upon a user's preference. The bounded control area for selection control functions may be used in conjunction with unique type of hop-cursors, for different types of displays that change automatically when the display content changes.

23 Claims, 8 Drawing Sheets

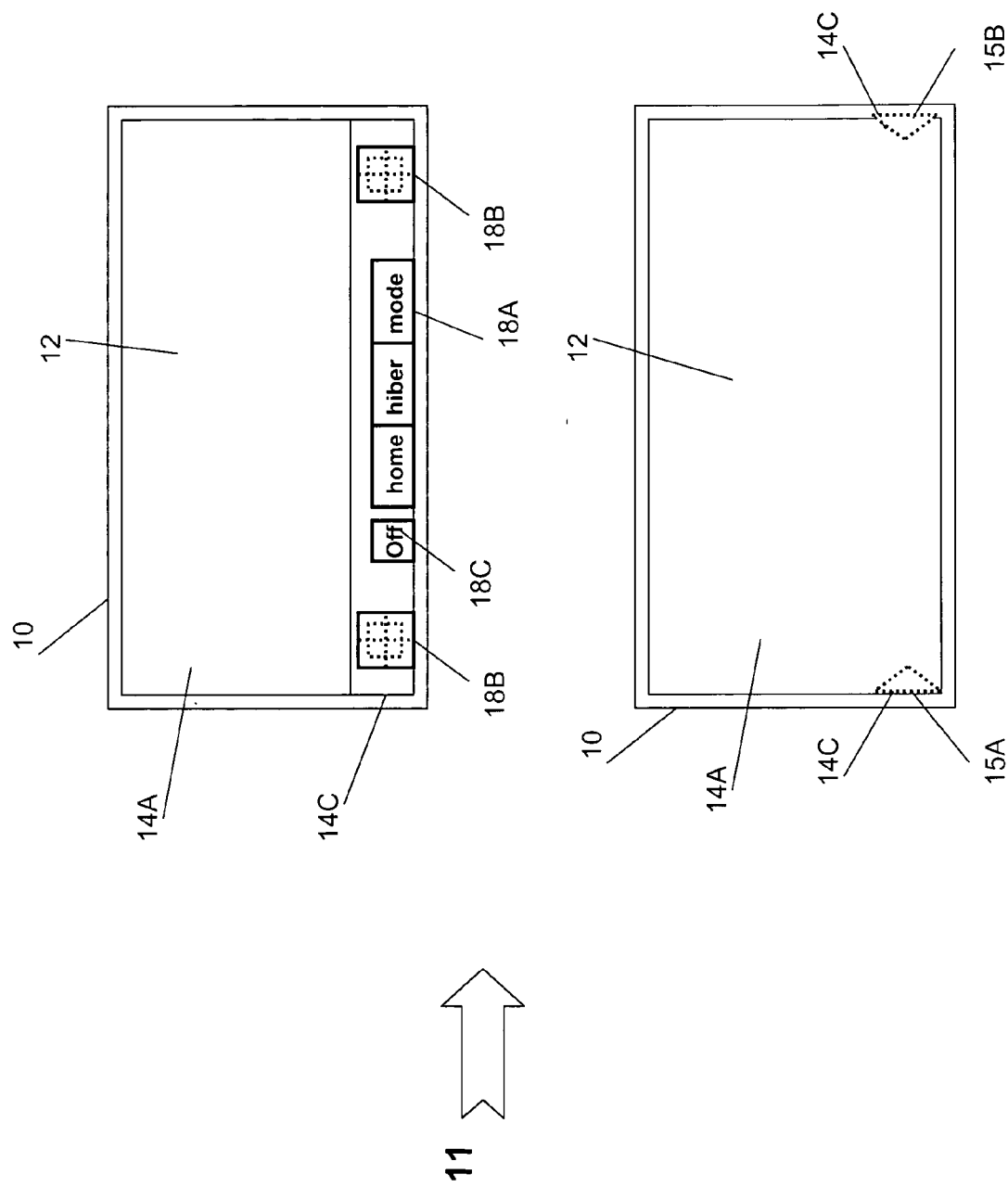

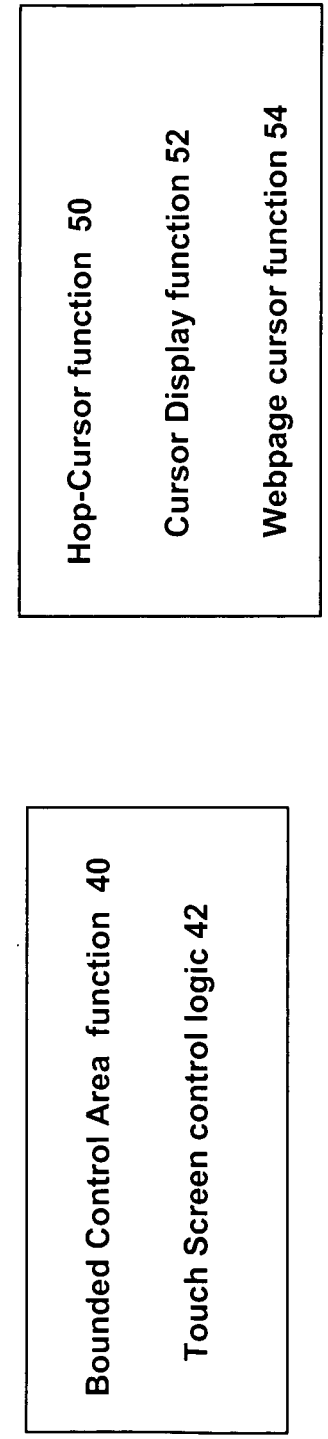

| |
|---|
| partitioning the touch screen on a handheld touch screen equipped handheld device into a bounded control area set aside for touch screen control. 60 |
| positioning a hop-cursor on the display screen. 62 |
| using scroll navigation functions on the bounded control area to scroll the display screen contents or the hop-cursor or both. 64 |
| making the hop-cursor change the shape and making a hop-cursor as a highlight for webpage links and embedded spaces. 66 |
| changing the shape and size of the hop-cursor based on the display contents and minimizing, by the user, the display of bounded control area when the display screen has display of information only and maximizing by the user when the display screen contents requires user interface functions. 68 |
| positioning the bounded control area on any part of the display screen based on a user preference and switching between using the bounded control area for user interface functions and the entire touch screen, based on user preference. 70 |
| removing the display of hop-cursor on the display screen for display of information and displaying when the display screen contents require navigation functions. 72 |
| minimizing, by the user, the display of control area when the display screen has display of information only and is maximizing when the display screen contents requires navigation functions. 74 |
| segregating the control area into multiple touch control areas that may be used for functions of scroll, action, zoom, mode control, and home. 76 |
| switching between using the control area for navigation functions and the entire touch screen for navigation, based on user preference. 78 |

Figure 5A

| displaying a hop-cursor from a group of icon highlight cursor, list item highlight cursor, map area highlight cursor, link highlight cursor, and space highlight cursor 80 |

| changing automatically the hop-cursor from the group of cursors to match the display contents from a group of, icons, list items, map, web page with links and display with embedded blank spaces. 82 |

| adjusting the size of the hop-cursor to match the scaling of the display contents. 84 |

| hop-positioning the hop-cursor to one of the selectable, icons, list items, map areas, links and the embedded blank spaces on the display by scroll function keys. 86 |

| highlighting by color and size the hop location where the hop-cursor rests. 88 |

| displaying a square for an icon cursor, a horizontal rectangle for a list item cursor, a cross hair for a map cursor, a shaded highlight rectangle for a link cursor, and a shaded rectangle for a embedded blank space cursor. 90 |

| hopping from link to link and resting only on a link and highlighting the link location by size on a web page when the cursor keys are scrolled, enabling a link to be quickly selected and linked to. 92 |

| hopping from embedded bank space to space and resting only on a blank space and highlighting the space location by size on a web page when the cursor keys are scrolled, enabling location on a webpage to be selected for scaling operation. 94 |

Figure 5B

APPARATUS AND METHOD FOR TOUCH SCREEN USER INTERFACE FOR HANDHELD ELECTRIC DEVICES PART II

CROSS REFERENCE

This application claims priority on Provisional Application Ser. No. U.S. 61/212,095, Titled "Method and Apparatus for Touch Screen Navigation User Interface for Handheld Electronic Devices," Filed On Apr. 7, 2009, By Tara Chand Singhal. The Contents of the Provisional Application Ser. No. 61/212,095 are incorporated herein by reference.

This application is related to and also claims priority on U.S. application Ser. No. 12/454,345 Titled "Apparatus and Method for Touch Screen User Interface for Handheld Electronic Devices Part I" Filed On May, 15, 2009, By Tara Chand Singhal. The Contents of the application Ser. No. 12/454,345 are incorporated herein by reference.

FIELD OF THE INVENTION

The embodiments described herein are for touch screen user interface navigation and control for handheld electronic devices.

BACKGROUND

Touch screen control technology has been in use for many years in applications such as ATM and airport check-in kiosks among similar other applications. The touch sensitive technology has also been used in laptops for cursor control for many years.

Recently, the touch screen control technology is being widely adapted in hand held electronic devices. Cell phones and particularly iPhone® (iphone) are a prime example of that application.

For application in iphone, the touch screen technology has been vastly improved in both the quality and speed of the touch response using capacitive touch sensors. In addition, the iphone touch screen application is designed to detect different type of touches such as, finger swipe, a pinch out and pinch in movement using a thumb and a finger, in addition to touching an icon to activate that icon function.

While recently there has been vast improvement in touch screen user interface technology in handheld electronic devices, there is still a need to further improve the user interface experience in hand held electronic devices.

Hence, it is the objective of the embodiments to have an improved user interface via a touch screen in hand held electronic devices.

It is also the objective of the embodiments to have an improved navigation and control function for user interface via a touch screen in hand held devices.

SUMMARY

Some touch screen equipped handheld electronic devices such as iPhone® and other cell phones, exclusively have a touch screen display and use an entire touch screen for controlling the functions and operations of the device in a manner where the cursor has been eliminated and instead a user is required to use and move his/her finger and thumb over an entire touch screen to perform the navigation and control functions to be able to navigate, select, activate and use functions and features of the handheld device.

That exclusive use of touch screen for controlling the functions of the handheld device may not be desirable for handheld devices, as this type of user interface requires a user to be able to put a finger on an item on a small touch screen display of a handheld device and also be required to use both hands, one for holding the handheld device and for the other hand's finger and thumb to be used for control and navigation functions such as, scrolling, item selection, and zoom control. Hence a new user interface is required and needed for touch screen equipped handheld devices, which does not have these issues.

Applicant's patent application Ser. No. 12/454,345, titled "Apparatus and Method for Touch Screen User Interface for Handheld Electronic Devices Part I" addressed these issues and disclosed embodiments that teach use of a separate bounded touch screen control surface that is positioned next to a display screen and that is exclusively used for touch control navigation and control functions.

Applicant's current application, Part II teaches a bounded touch control area that is part of an and overlaid over an existing touch screen in touch screen equipped handheld devices, that would enable the same user interface features as described in Part I application.

A system of touch screen user interface in a touch screen equipped handheld electronic device has a bounded control area on a touch screen that is used for touch control in lieu of the entire touch screen surface. The control area is able to provide touch control user interface functions of scroll, zoom, action item selection, and other control functions. Thereby the bounded control area enables the handheld device to be touch controlled from the bounded control area alone. The bounded control area may be positioned based on a user's preference on any part of the touch screen.

The bounded control area may be minimized enabling the entire touch screen to resume its touch screen control function in lieu of the control area control. The control area may be maximized enabling only the control area to be used for touch screen control. Thereby the touch control may be switched between these modes of touch control, depending upon a user's preference. It is believed, that for prior art handheld devices that provide only a touch screen for navigation and control, the dual function touch screen control of the embodiments would provide a more versatile user interface letting the user select and switch to the type of control most convenient to them at any time.

The bounded control area works in conjunction with unique types of hop-cursors. A hop-cursor management function facilitates use of different types of hop-cursors on the small screen of handheld devices for different types of displays that change automatically when the display content changes. These hop-cursors are manipulated with the help of the bounded touch screen control area.

The bounded touch control area embodiments, it is believed, provides a compact, versatile, and more effective user interface in handheld electronic devices. These and other features of the embodiments would become clear with the help of the description and accompanying drawings.

BRIEF DESCRIPTION OF THE DRAWINGS

Some of the novel features of the embodiments will be best understood from the accompanying drawings, taken in conjunction with the accompanying description, in which similar reference characters refer to similar parts, and in which:

FIG. 1A-B are block diagrams that illustrates features of the embodiments of touch screen control surface user interface.

FIGS. 4A-B are block diagram that illustrates functions of the present embodiment of touch screen bounded control area function and hop-cursor function.

FIG. 5A is a method diagram that illustrates features of the present preferred embodiment of touch screen control surface.

FIG. 5B is a method diagram that illustrates features of the present preferred embodiment of touch screen control surface.

DESCRIPTION

Introduction

Figure 1A:
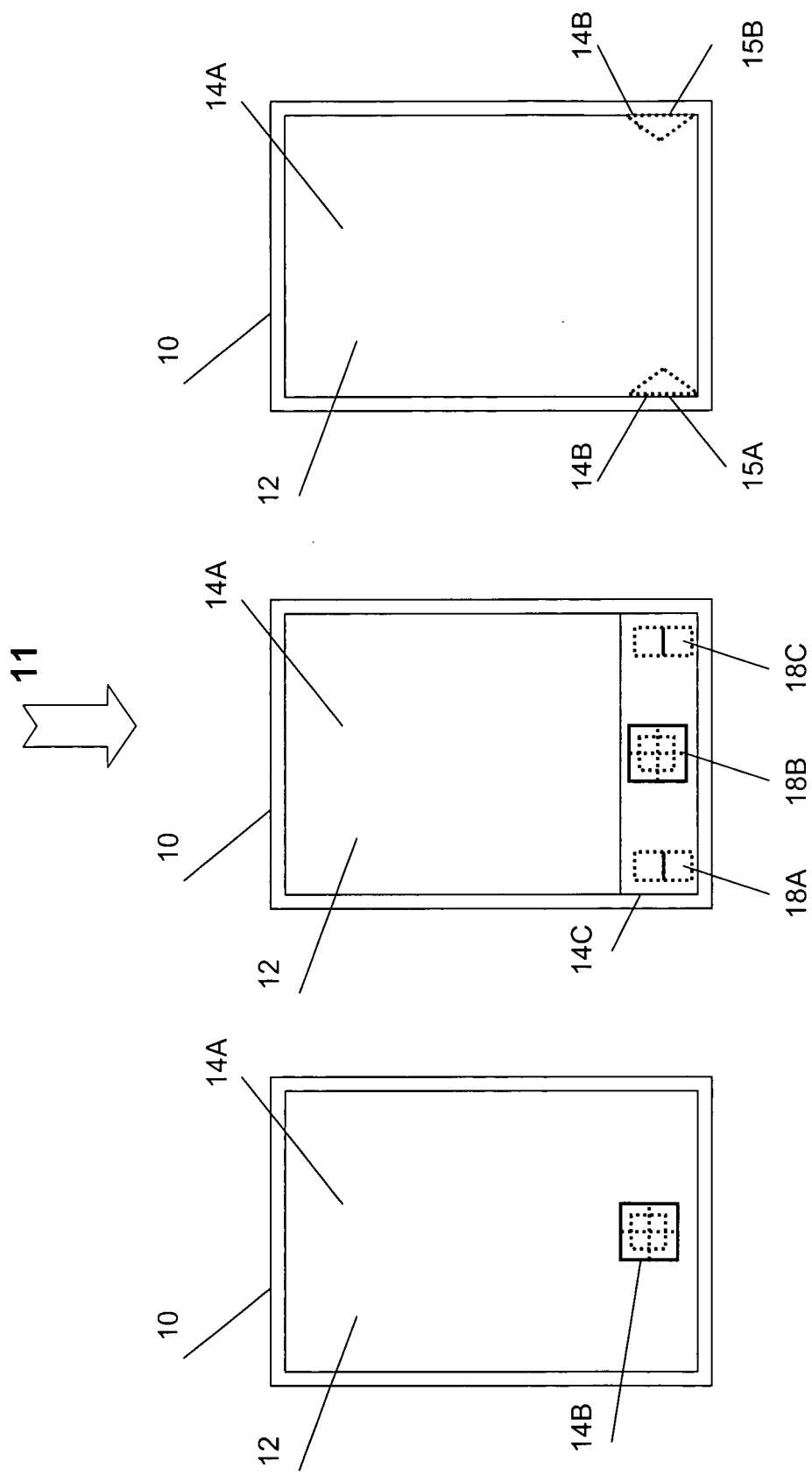

With reference to FIGS. 1A and 1B, a system 11 of touch screen user interface in a touch screen equipped handheld electronic device 10 has a bounded control area 14B, 14C on a touch screen 12 that is used for touch control in lieu of the entire touch screen surface 12. The bounded control area 14B, 14C is shown in two different embodiments as embodiment 14B, as in FIG. 1A, in a form of a floating and movable control area on the screen surface 12 and as embodiment 14C, in FIG. 1Bm which occupies a fixed part of the screen 12.

The system 11 of touch screen user interface in the handheld device 10 has a bounded control area function 40 (illustrated later with reference to FIGS. 4A and 5A), operating as part of the device 10's operating system, that displays a bounded control area on a touch screen display equipped handheld device 10, where the bounded control area 14B, 14C is used for touch control in lieu of the entire touch screen surface 12 of the device 10. The function 40 enables the bounded control area to provide touch control user interface functions, thereby enabling the device to be touch controlled from the bounded control area 14B, 14C alone.

The bounded control area function 40 essentially partitions the screen 12 into the screen part 14A and the screen part as either 14B or 14C. The bounded control area 14B, 14C is able to provide touch control user interface functions of scroll, zoom, action item selection, and other control functions. Thereby the floating control area 14B or the fixed control area 14C enable the handheld device 10 to be touch controlled from the fixed or floating control areas alone, in lieu of the entire touch screen surface 12.

The floating control area 14B may be moved and positioned based on a user's preference on any part of the touch screen 12. The touch screen 12 may be partitioned into an exclusive fixed touch control area 14C and a display content area 14A, where the touch control area 14C is fixed on the touch screen relative to the display 14A. Both the floating control area 14B and the fixed control area 14C, occupy a relatively small area of the entire touch screen display surface 12, as described later.

The bounded control are function 40 minimizes the bounded control areas 14B, 14C enabling the entire touch screen 12 to resume a touch screen control in lieu of the bounded control area control. The function 40 maximizes the bounded control area enabling only the bounded control area to be used for a touch screen control, thereby enabling switching between these two modes of touch control, that of entire screen 12 or the bounded control area 14B, 14C.

As shown in FIGS. 1A and 1B, both the floating control area 14B and the fixed control area 14C may be minimized as 15A and 15B enabling the entire touch screen 12 to resume its touch screen control function in lieu of the control area control 14B or 14C. The minimized control area 15A, 15B may be maximized enabling only the control area 14B or 14C to be used for touch screen control. Thereby the touch control on the handheld device 10 may be switched between these modes of touch control, depending upon a user's preference or based on the application that is being used in the device 10.

The dual function touch screen control of the embodiment described herein would provide a more versatile user interface letting the user select and switch to the type of touch control most convenient to them at any time. The dual function touch screen control may also be switched automatically based on the type of application and the display, where the bounded control area function 40 would sense from the device operating system, the application and/or the type of display being used.

FIGS. 1A and 1B show different orientation of the handheld device 10, and the positioning and minimization of the floating control area 14B or fixed control area 14C. In FIG. 1A, the portrait orientations of the device 10 show different positions of the fixed and floating maximized control areas 14B and 14C and their minimized versions 15A and 15B at different parts of the screen 12. In FIG. 1B, the landscape orientations of the device 10, show a different position of the fixed maximized control area 14C and the minimized versions 15A and 15B at different parts of the screen 12. The minimized versions 15A and 15B may be placed on different parts of the screen 12, making them easy to be maximized from that part of the screen with a touch slide action on the minimized areas 15A, 15B.

The control area 14B, 14C alone may be able to provide touch control user interface functions of scroll, zoom and action item selection, thereby enabling the device 10 to be touch controlled from either the floating control area 14B alone or the fixed control area 14C alone. A user may prefer one or the other type of control from the fixed control area 14C or the floating control area 14B.

Figures 2A, 2B:
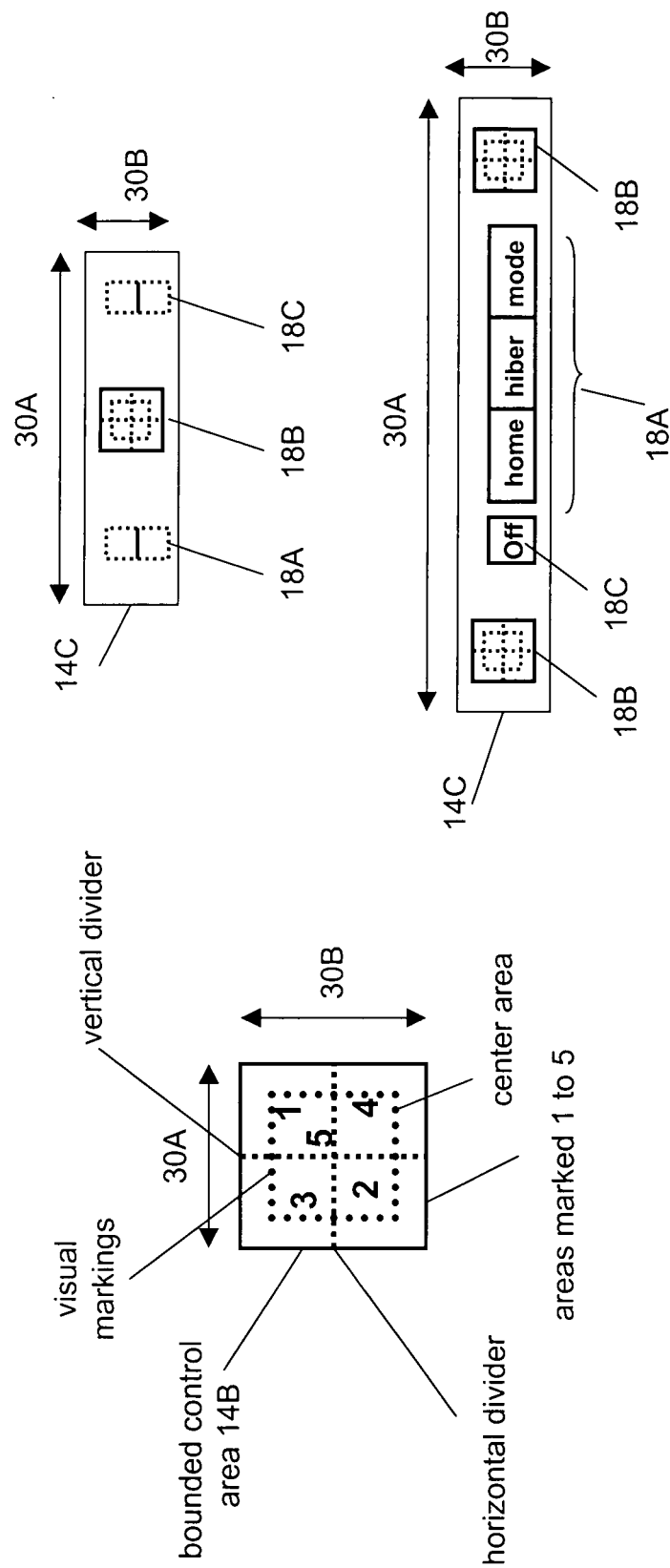
FIGS. 2A-B are a block diagram that illustrates features of the present embodiment of touch screen control surface user touch areas on the surface.

As an illustration, the details of how the touch control area 14B, 14C may be used for a large number of touch control commands, are illustrated with reference to FIGS. 2A and 2B. In FIG. 2A, the control area 14B may be partitioned into overlapping five areas that would provide a range of touch control commands as described later. As illustrated in FIG. 2B, the fixed control area 14C may be partitioned into multiple control areas 18A, 18B and 18C. The fixed control area 14C and floating control areas 14B may be partitioned in many other ways into control touch areas, not all of them are illustrated in FIGS. 2A and 2B.

In summary, as illustrated in FIGS. 1A and 1B, in the system 11 of touch screen user interface the control area 14B or 14C is minimized as 15A or 15B enabling the entire touch screen 12 to resume a touch screen control in lieu of the control area control 14B or 14C, where the minimized icons 15A and 15B located at different part of the screen 12 may be used to maximize the control area 14B or 14C. The control area 14B or 14C is maximized enabling only the control area 14B or 14C to be used for touch screen control, thereby enabling switching between these two modes of touch screen control that is either from the entire screen 12 or the control area 14B or 14C.

Bounded Control Area Function 40

A size of the bounded control area 14B, 14C may be limited to 7.5% to 15% space from the entire touch screen surface 12, although it may be more or less based on different type of touch screen equipped handheld device. The bounded control area 14B, 14C, operated by a thumb tip touch actions of slide and touch, provides basic touch control user interface functions of scroll and action item selection, as well as other functions of zoom, scale etc.

In the system of touch screen user interface, as described above, the size of the floating control area 14B, 14C takes a substantially 7.5%-15% space from the touch screen 12, relative to remainder of touch screen display area 14A.

For illustration, a typical screen area 12 for handheld device 10 may be 3 inch by 2 inch. For this screen area of six square inches, a square control area 14B may be 0.7 inch square that equals to 0.49 square inches, which is 8% of the screen size area of six square inches.

The control area 14C may be rectangle of size 0.45 inch by 2 inch that equals to 0.9 square inch, which is equal to 15% of the screen size. Thus the control area 14B, 14C on the control screen 12 may equal roughly to 7.5% to 15% of the six square inch area of the screen.

As illustrated with reference to FIG. 4A, the bounded control area function 40 has a touch screen control logic 42 that partitions the touch screen 12 into a bounded control area 14B, 14C for touch screen control and remainder area for display screen as 14A. The bounded control area 14B, 14C provides for multiple touch control commands.

The logic 42 segregates the bounded control area 14B, 14C into multiple touch control areas that may be used for functions of scroll, action, zoom, mode control, and home. The touch screen logic 42 enables touch commands on the bounded control area to provide touch control types to include slide and touch, thereby enabling only the bounded control area of the touch screen to provide user interface functions of the handheld device.

The logic 42 minimizes display of the bounded control area and maximizes the bounded control area when the display screen content requires user interface functions using the bounded control area. The logic 42 activates the entire touch screen control when the bounded control area is minimized enabling switching between the control area control and entire touch screen control.

The logic 42 may position the bounded control area on any part of the display screen, to include, a top, a bottom, a left and a right of the display screen based on a user preference. The logic 42 interfaces with the operating system of the device 10 to facilitate these functions of the control logic 42.

As illustrated in FIGS. 1A and 1B, the screen 12 may be partitioned into areas 14A and 14B or area 14C to be able to provide the touch screen area 14B 14C. The floating control area 14B may be transparent and overlaid over the touch display, enabling the display screen content to be visible under the control area 14B, as the control area 14B is being used for touch control only.

The bounded control area 14B is positioned on the touch screen display based on user preference, and may be operable from either the left hand or right hand thumb while the handheld device is held in either hand. Further the control area 14C may be operable with both hand's thumbs while the handheld device 10 is held in both hands as would be a landscape screen orientation device as in FIG. 1B.

The control area 14B, 14C is positioned on the touch screen 12, in either arrangement based on user preference and it may be moved to be placed on the screen 12, where it is convenient to use. It may be positioned on the top, bottom, left or right of the screen 12, where ever it is convenient for the user.

As illustrated in FIGS. 1A and 1B, the control area 14C may be segregated into multiple touch control areas 18A, 18B, 18C that may be used for functions of scroll, action, zoom and home. The shape of the control area 14B, 14C may be a square or rectangle. The bounded control area 14B may be transparent that enable the display screen 12 content to be visible under the bounded control area 14B.

With reference to FIG. 2A, the control surface 14B has touch areas, such as five overlapping areas, marked as 1, 2, 3, 4 and 5. A size 30A×30B of ½×½ inch may be preferred for small handheld devices 10 and size of ¾×¾ inch may be preferred for larger handheld devices 10. With reference to FIG. 2B, the control area 14C may have multiple touch areas. The size 30A×30B of control surface may be 2 inch by 0.45 inch for a portrait orientation of the device 10 and may be 3 inch by 0.45 inch for a landscape orientation of the device 10.

The control surface 14B may be visually partitioned to show the touch areas by lines as in FIG. 2A. The visual partition may also use a combination of lines and/or shading. As a simplified illustration, in FIG. 2A, a vertical divider as a dotted line and a horizontal divider as a dotted line in the middle of the control surface 14B demarcate the overlapping top 1 and bottom 2, and the left 3 and right 4 touch areas. A square dotted line box area 5 on surface 14B identifies the overlapping center touch area. Similarly control area 14C may be partitioned in multiple areas 18A, 18B and 18C, where 18B may be used for cursor movement functions and 18A and 18C may be used for other control functions.

As a simplified illustration of the use and operation of the touch screen control surface 14B, as in FIG. 2A, a thumb tip may be positioned on the center area 0 and slid up to area 1 and then slid back to center area 0 to cause a cursor to move up for a time or distance on a display screen. The duration of the time or the distance would be represented by how long the thumb tip touch is maintained on area 1, before sliding it back to the center area. The same would be applicable when the thumb tip is positioned on the center area and slid to areas 2, 3 or 4, for corresponding movements in these three directions of down, left or right. Further, the rate of navigation movement may be set up as a parameter in the control logic 42.

When the thumb tip is tapped on the center area, that is, touched once, such a control action on the control surface 14B may be used to select the function that is highlighted by the cursor on the display screen. When the thumb tip is tapped twice on the center area, that is, touched twice with a very short time interval, such a control action on the control surface 14B may be used to select the other functional modes of device 10.

For the embodiment as illustrated in FIG. 1A, the control logic 42 may also be used to position the control surface 14B to be set on any area of the touch screen 12 for user convenience and visually highlighted to stand apart from the display of the screen contents. The control surface 14B may be transparent enabling see through of the underlying screen content on screen 12.

The control surface 14B, operable by a left or right thumb tip, while the handheld device is held in the palm of the left or right hand, enables navigation control by the thumb tip alone and thus operation of the device 10 with one hand alone. The control surface 14B is substantially oversized for a thumb tip enabling the thumb tip to exercise control of the navigation.

The bounded control area function 40 with the help of touch screen control logic 42 performs the tasks of:

(i) Determine device operation mode.

(ii) Display bounded control area from one of a floating or fixed bounded control area based on user preference and the display bounded control area task displays the floating or fixed control area 14B, 14C on the screen 12.

(iii) Position bounded control area on display, the position floating control task moves the control area where the user desires either on pre-based setting or amenable to be moved to a setting that is saved for the next operation.

(iv) Determine touch areas of the bounded control area, based on position on the touch screen, this task based on the position of the control area, determines where the touch area is in pixels for the logic that responds to the touch on the control area. For example, each area is identified by its pixel boundary.

(v) Minimize/maximize the bounded control area, the minimize/maximize task acts on user commands on the minimized and the maximized floating touch area and for a maximized bounded control area, detect touch on the bounded control area.

(vi) Determine type of touch from different types of touches such as slide and touch and convert the specific type of touch to a specific type of control command function for the handheld device, and (vii) Implement the specific control function through the device 10 operating system. This task determines the type of the touch and converts the touch to the control function and task implements the control function.

The handheld device has an operating system (OS). The operation mode task determines the mode the device is operating in from the device OS. The mode task is then able to decide when to switch to the bounded area control operation and when to switch to the entire touch screen operation.

The technology of touch screen control user interface is prior art. The prior art touch screen has two layers, a conductive and a non conductive layer, the interfaces from these layers are connected to a microprocessor where software determines the location and the type of touch and feeds those signals to the software functions that provide actual device functions of navigation and control.

The technology and supporting logic for touch screen control logic 42 is prior art. The embodiments here teach the control logic 42 that supports the application of that prior art technology for the operation of a bounded control area 14B and 14C.

Hop-Cursor Function 50

The control areas 14B or 14C, for selection control functions, may be used in conjunction with unique types of hop-cursors. A hop-cursor function 50 (illustrated later with reference to FIGS. 4B and 5B) facilitates use of different types of hop-cursors on the small screen 12 of handheld devices 10. The hop-cursor, for different types of displays, changes automatically when the display content changes. These hop-cursors are manipulated with the help of the floating or the fixed touch screen control area 14B and 14C.

Figure 3A:
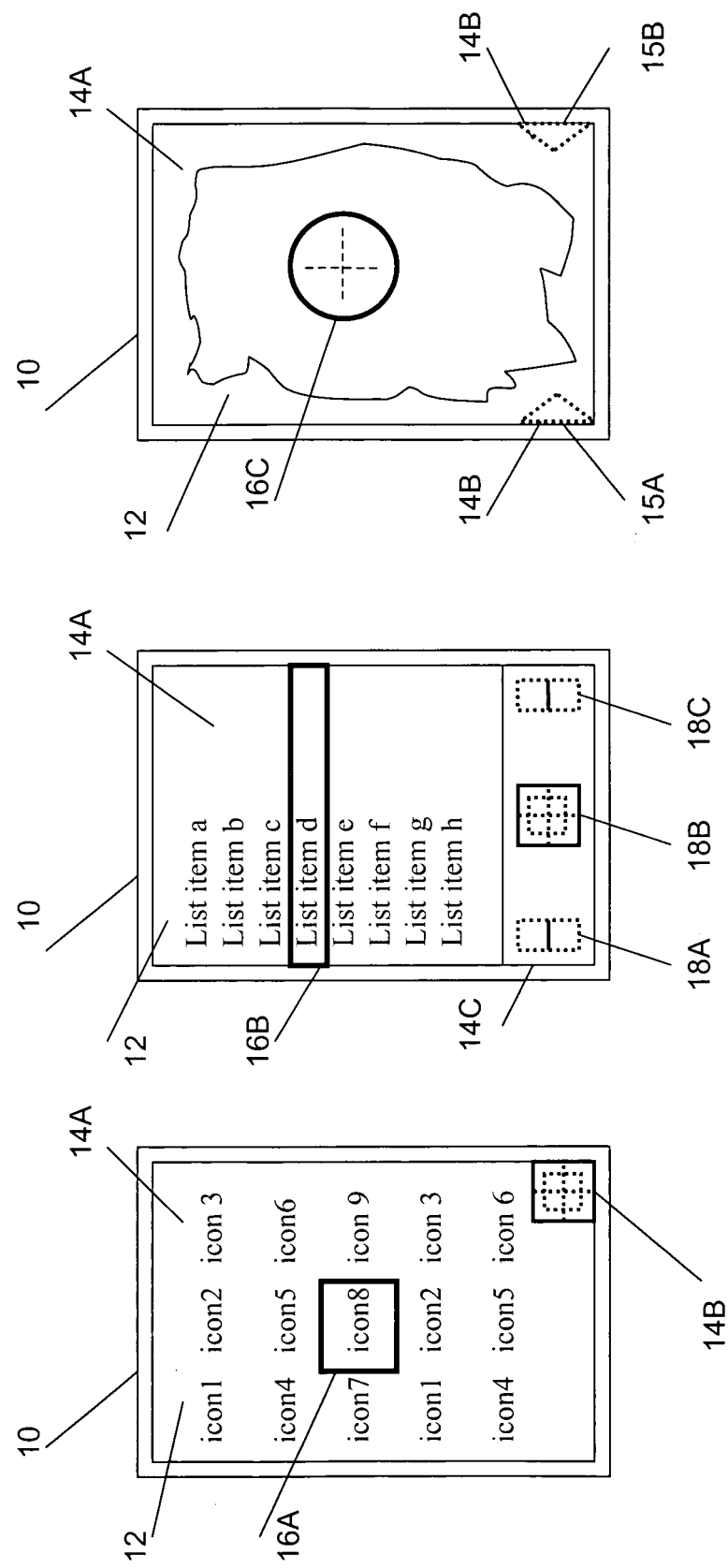
FIGS. 3A-B are block diagrams that illustrates features of different embodiments of hop-cursors with the touch screen user interface embodiments.
Figure 3B:
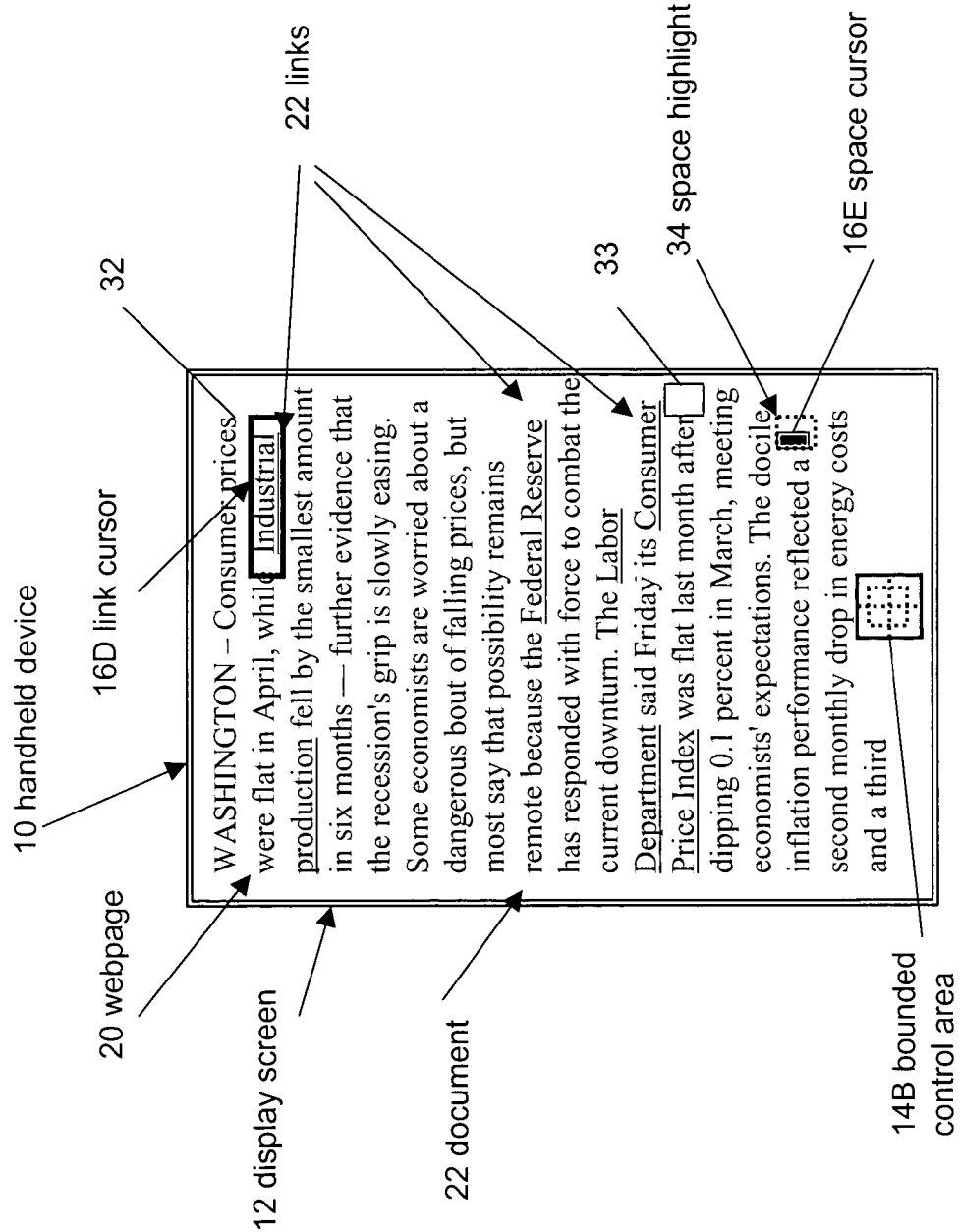

With reference to FIGS. 3A, 3B and 4B, a hop-cursor function 50 displays hop-cursors that may include (i) an icon highlight cursor 16A, (ii) a list item highlight cursor 16B, (iii) a map area highlight cursor 16C, (iv) a webpage link highlight cursor 16D, and (v) a blank-space highlight cursor 16E. The hop-cursor function 50 changes the hop-cursors automatically from this group of hop-cursors to match the display contents that may include, (i) icons, (ii) list items, (iii) a map, (iv) a webpage with links, and (v) a document with blank-spaces.

The hop-cursors 16A to 16E hop from an item to item on the display, instead of being free moving like in desk top and laptop computers. The hop-cursor function 50 hops the hop-cursor to rest on an icon, a list item, a map area, a webpage link and a document blank-space, when the hop-cursor is scrolled. The hop-cursor function 50 also adjusts the size of the hop-cursor to match the scaling of the display contents.

The hop-cursors 16A to 16E make it easy for a user to quickly identify and select a function or feature with the help of the bounded control area 14B, 14C, without having to use finger and thumb to identify and select these functions and features on the entire touch screen 12.

As illustrated in FIG. 3A, the hop-cursor function 50 has a cursor display function 52 (illustrated with reference to FIG. 4B) that displays a hop-cursor as either as a icon highlight cursor 16A, a list item highlight cursor 16B, or map area highlight cursor 16C. The cursor display changes automatically from this group of cursors to match the display contents of icons, list items, and a map. The hop-cursor is scrolled with the help of scroll function on the control area 14B 14C and hops from an item to item on the display, instead of being free moving like in desk top and laptop computers.

The icon hop-cursor 16A may also be used to highlight and hop between the keys of a simulated keyboard on the screen 12 and select a key for typing with the help of the control area 14B, 14C which provide for scroll and selection functions. This, it is believed, may provide for entering text or typing using a simulated keyboard display, without having to use a finger on the screen 12 to identify each key by a finger touch.

As illustrated in FIG. 3B, when the display is a webpage 20 on the display screen 12 of a handheld device 10, which displays embedded hyperlinks 22, a link cursor 16D would hop from link 22 to link 22 on the webpage 20. Hence, a hop-cursor 16D is also provided for a webpage 20 and a document display 22 in the handheld device 10.

The cursor display function 52 when detects a webpage display or a document display on the screen 12, enables display of a link cursor 16D and enables the hop-cursor 16D to hop from link to link 22 when the cursor 16D is scrolled. Where the hop-cursor hops to rest only on a link and highlights the link location 32, enabling a link to be quickly selected, with the help of transparent control area 14B.

As also illustrated in FIG. 3B, the webpage 20 also has spaces between paragraphs and words of the content, where the user may want to scale up that specific area of the small screen. A space cursor 16E would jump from space to space and help quickly select the space for a scaling operation on that part of the space to space up the size of the display. The space cursor may also be used in text based documents.

Hence the space cursor 16E is also provided for the webpage and document content 20, 22, where the cursor display function 52 hops a space cursor 16E from an embedded space 33 to space 33 and rests only on a blank space 33 and highlights that space location 34 on a web 20 and document page 22 when the hop-cursor 16E is scrolled. This enables location on a web and a document page to be quickly selected for enabling scaling or other operations, with the help of the control area 14B, 14C.

When on a webpage, the function also enables switching back and forth from the display/use of the link cursor to display of the blank space cursor on customer action that facilitates quick use and review of webpage display content from a small display screen. Providing these hop-cursors 16A to 16E, as described above, does not rule out providing free moving cursors or character space cursors common in the prior art.

In one mode of use, for navigation on the display screen, the scroll action scrolls the hop-cursor to move the hop-cursor to place it on an item on the display screen. In another mode of use, the scroll function scrolls the display screen contents to move until the desired item is inside the fixed hop-cursor position.

In yet another mode of use, both the hop-cursor and the display screen may be scrolled, when the display screen is not large enough to display the entire list of items or choices, until the item to be selected is inside the hop-cursor. Then a touch action command may be used to activate the functions of the item so selected. For these three types of display contents, these modes of use do away with a free moving prior art cursor that is free to move on the entire screen, thus enabling a faster navigation and control of the handheld device.

With reference to FIG. 4B, a hop-cursor function 50 is illustrated. The hop-cursor function performs the tasks of, (i) determine display type and display scale, (ii) select cursor type for display, (iii) select cursor size for display scale, (iv) display the hop cursor, (v) apply cursor location highlight, (vi) hop-cursor movement control by scroll keys, and (vii) input cursor location to touch command function. To facilitate these tasks, the hop-cursor function 50 has the sub-functions of cursor display function 52, and a webpage cursor function 54.

The cursor display function 52 displays a hop-cursor from a group of, an icon highlight cursor, a list item highlight cursor, a map area highlight cursor, a link highlight cursor, and a space highlight cursor. The cursor display function 52 changes automatically the hop-cursor from this group of cursors to match the display contents that may include display of icons, list items, map, and web page with embedded hyper links and text display with embedded blank spaces.

The cursor display function 52 adjusts the size of the hop-cursor to match the scaling of the display contents. The hop-cursor control function 50 hops the hop-cursor to one of the selectable, icons, list items, map areas, links and the embedded blank spaces on the display by scroll function keys. The cursor display function 52 highlights by color and/or size the hop location where the cursor rests. The cursor control function displays a square for an icon cursor, a horizontal rectangle for a list item cursor, a cross hair for a map cursor, a shaded highlight rectangle for a link cursor, and a shaded rectangle for an embedded blank space cursor.

The webpage cursor function 54 detects a webpage display, and for a link cursor, hops the link cursor from link to link and rests only on a link and highlights the link location by size on a web page when the cursor keys are scrolled, enabling a link to be quickly selected. The function 54 also hops a space cursor from embedded space to space and rests only on a blank space and highlights the space location on a web page when the cursor keys are scrolled, enabling location on a webpage to be selected for enabling a scaling operation. The function 54 switches back and forth from the display of the link cursor to display of the blank space cursor on a user action.

The function 54 that hops the link cursor from link to link and rests only on a link and highlights the link location by size on a web page when the cursor keys are scrolled, that enables a link to be quickly selected and linked to.

The function 54 also hops the blank space cursor from embedded bank space to space and rests only on a blank space and highlights the space location by size on a web page when the cursor keys are scrolled that enables location on a webpage to be selected for scaling operation.

Method of Operation

The method of touch screen user interface navigation, as illustrated with reference to FIG. 5A, in a handheld device that has a display screen overlaid with a touch screen for touch screen control, has the steps, where not all steps may be used or used in the order specified.

At step 60, partitioning the touch screen on a handheld touch screen equipped handheld device into a bounded control area set aside for touch screen control on the display screen and using the bounded control area for touch control commands.

At step 62, positioning a hop-cursor on the display screen that is overlaid on the display content as a transparent window, and varying the shape and size of the window to the format of the display content.

At step 64, using scroll navigation functions on the bounded control area to scroll the display screen contents, until the desired display choice is inside the window cursor and activating the item in the window cursor by touching the control area, whereby enabling only the bounded control area for user interface functions of the handheld device.

At step 66, making the hop-cursor in the shape of a square for icons, a rectangle for a list of items, or a circle for graphical displays, that may be displayed on the display screen, and making a hop-cursor as a highlight for webpage links and embedded spaces.

At step 68, changing the shape and size of the window based on the display contents and minimizing, by the user, the display of bounded control area when the display screen has display of information only and maximizing by the user when the display screen contents requires user interface functions At step 70, positioning the bounded control area on any part of the display screen based on a user preference, to include, a top, a bottom, a left and a right of the display screen based on a user preference and switching between using the bounded control area for user interface functions and the entire touch screen, based on user preference At step 72, removing the display of window on the display screen for display of information and displaying when the display screen contents require navigation functions.

At step 74, minimizing, by the user, the display of control area when the display screen has display of information only and is maximizing by the user when the display screen contents requires navigation functions.

At step 76, segregating the control area is into multiple touch control areas that may be used for functions of scroll, action, zoom, mode control, and home.

At step 78, switching between using the control area for navigation functions and the entire touch screen for navigation, based on user preference.

As in FIG. 5B, the method of cursor display and control on a display screen of a handheld device, has the steps, where not all steps may be used or used in the order specified herein.

At step 80, displaying a hop-cursor from a group of, an icon highlight cursor, a list item highlight cursor, a map area highlight cursor, and a webpage highlight cursor.

At step 82, changing automatically the hop-cursor from this group of cursors to match the display contents from a group of, display of icons, list of items, a map, and a webpage.

At step 84, adjusting the size of the hop-cursor to match the scaling of the display contents.

At step 86, hop-positioning the hop-cursor to one of the selectable, icons, list items, map areas, webpage for the embedded links and blank spaces on the display by scroll function keys.

At step 88, highlighting by color and size the hop location where the hop-cursor rests.

At step 90, displaying a square for an icon cursor, a horizontal rectangle for a list item cursor, a cross hair for a map cursor, a shaded highlight rectangle for a link cursor, and a shaded rectangle for an embedded blank space cursor.

At step 92, hopping from link to link and resting only on a link and highlighting the link location by size on a web page when the cursor keys are scrolled, enabling a link to be quickly selected and linked to.

At step 94, hopping from embedded bank space to space and resting only on a blank space and highlighting the space location by size on a web page when the cursor keys are scrolled, enabling location on a webpage to be selected for scaling operation.

Handheld device 10 operation is governed by an operating system. The operating system is a specialized software that facilitates the features and function of the device 10 and the software technology of such operating systems is prior art. The bounded control area function 40 and the hop-cursor function 50, as described above may preferably be part of the device's operating system, as they would be independent of an application hosted on the device 10.

In summary, the embodiments provide an improved user interface using a touch screen control surface for hand held electronic devices, where either a bounded control area on the screen or the entire screen area may be used for touch control based on a user's preference. The use of the bounded control area is accompanied with a hop-cursor that changes size and shape of the hop-cursor based on the display content and hops from an icon to icon or item to item or link to link. Thus, making selection and activation of functions easier, without having to place and touch a finger on any part of the screen 12.

While the particular preferred embodiment, as illustrated herein and disclosed in detail is fully capable of obtaining the objective and providing the advantages herein before stated, it is to be understood that it is merely illustrative of the presently preferred embodiments and that no limitations are intended to the details of construction or design herein shown other than as described in the appended claims.

What is claimed is:

1. A system of touch screen user interface in a handheld device comprising:
   a. the handheld device is of a type of a smart phone or a tablet computer and has a CPU, a memory, a storage, and a logic stored in the memory, the logic executing in the CPU simulates a bounded touch control area on a part of a touch screen display of the handheld device, the bounded touch control area is used for touch control in lieu of an entire touch screen display surface of the device;
   b. the logic simulates the bounded touch control area as an overlay over the part of the touch screen display for exclusive use as a touch control interface and does not display digital content from the device on the area;
   c. the logic enables the bounded touch control area to provide touch control user interface functions that include a sequence of at least one touch and slide-touch actions to control operation of the device, thereby enabling the device to be touch controlled from the bounded touch control area alone and the logic enables the bounded touch control area to be minimized for then the entire touch screen to be used for touch control.

2. The system of touch screen user interface in a handheld device as in claim 1, comprising:
   a. the logic simulates a size of the bounded touch control area that is substantially 7.5% to 15% space from the entire touch screen display surface;
   b. the bounded touch control area, operated by a thumb tip touch actions of slide and touch, provides touch control user interface functions of scroll, zoom and action item selection.

3. The system of touch screen user interface in a handheld device as in claim 1, comprising:
   the logic maximizes the bounded touch control area enabling only the bounded touch control area to be used as a touch screen control, thereby enabling switching between these two modes of touch control, bounded touch control area alone and the entire touch screen display.

4. The system of touch screen user interface in a handheld device as in claim 1, comprising:
   the logic positions the bounded touch control area on any part of the touch screen display surface based on user preference, and is operable from either a left hand or a right hand thumb while the handheld device is held in either hand.

5. The system of touch screen user interface in a handheld device as in claim 1, comprising:
   the logic display the bounded touch control area as transparent that enables the display screen content to be visible under the bounded touch control area.

6. The system of touch screen user interface in a handheld device as in claim 1, comprising:
   a. a hop-cursor logic displays a window-cursor on an icon from a group of icons of, a grid item, a list item, a map area, a webpage link, and a blank-space in a document to highlight that icon;
   b. the hop-cursor logic automatically changes shape of the window-cursor to match the display contents from the group of, grid items, list items, a map, a webpage with links and a document with blank-spaces.

7. The system as in claim 6, further comprising:
   a. the hop-cursor logic hops the window-cursor to rest on an icon, a list item, a map area, a webpage link and a document blank-space, when the window-cursor is scrolled;
   b. the hop-cursor logic adjusts the size of the window-cursor to match the scaling of the display contents.

8. The system as in claim 6, further comprising:
   a. a webpage cursor logic that detects a webpage display, for a link cursor hops the cursor from link to link and rests only on a link and highlights the link location on a web page when the cursor keys are scrolled, enabling a link to be quickly selected;
   b. the webpage cursor logic hops a space cursor from embedded space to space and rests only on a blank space and highlights the space location on a web page when the cursor keys are scrolled, enabling location on a webpage to be selected for enabling a scaling operation;
   c. the webpage cursor logic switches back and forth from the display of the link cursor to display of the blank space cursor on a user action.

9. A system of touch screen user interface in a handheld device of a type of a smart phone or a tablet computer that has a display screen overlaid with a touch screen, comprising:
   a. a touch screen logic stored in a memory of the device and executing in a CPU of the device partitions the touch screen into a bounded touch control area that is set aside for touch screen control, the bounded touch control area provides for multiple touch control commands;
   b. the touch screen logic simulates the bounded touch control area as an overlay over a part of the touch screen display for exclusive use as a touch control interface and does not display digital content from the device on the area;
   c. the touch screen logic enables touch commands on the bounded control area to provide touch control types to include slide and touch that are used to control user interface functions of scroll and zoom and action item selection, thereby enabling only the bounded control area of the touch screen to provide user interface functions of the handheld device and the touch screen logic enables the bounded control area to be minimized, for the entire touch screen then to be used for touch control.

10. The system as in claim 9, further comprising:
the touch screen logic positions the bounded touch control area on any part of the display screen, to include, a top, a bottom, a left and a right of the display screen based on a user preference.

11. The system as in claim 9, further comprising:
the touch screen logic maximizes the display of the bounded touch control area when the display screen content requires user interface functions using the bounded touch control area.

12. The system as in claim 11, further comprising:
the touch screen logic activates the entire touch screen control when the bounded control area is minimized enabling switching between the touch control area control and entire touch screen control.

13. The system as in claim 9, further comprising:
the touch screen logic segregates the bounded touch control area into multiple touch control areas that may be used for functions of scroll, action, zoom, mode control, and home.

14. A method of cursor display and control on a display screen of a handheld device, comprising the steps of:
 a. displaying by a cursor logic, stored in a memory of the device and executing in a CPU of the device, a window-cursor on an icon from a group of icons of, a grid item, a list item, a map area, a webpage link, and a blank-space in a document to highlight that icon;
 b. changing by the cursor logic automatically shape of the window-cursor to match the display contents from the group of, the grid item, the list item, the map area, the webpage, and the blank-space in a document;
 c. detecting by a webpage cursor logic a webpage display, hopping by the webpage cursor logic, for a link cursor, from link to link and resting only on a link and highlighting the link location by size on a web page when the cursor keys are scrolled, for a link to be quickly selected and hopping by the webpage cursor logic for a space cursor from a blank space to a blank space and resting only on the blank space and highlighting the blank space location on the web page when the cursor keys are scrolled, enabling a space location on the webpage to be selected for a scaling operation.

15. The method as in claim 14, further comprising the steps of:
 adjusting by the cursor logic the size of the window-cursor to match the scaling of the display contents.

16. The method as in claim 14, further comprising the steps of:
 hop-positioning by the cursor logic the window-cursor to one of the selectable, icons, list items, map areas, webpage for the embedded links and blank spaces on the display by scroll function keys.

17. A method of touch screen user interface navigation in a handheld device that has a display screen overlaid with a touch screen for touch screen control, comprising the steps of:
 a. partitioning by a touch screen user interface logic stored in a memory of the device and executing in a CPU of the device the touch screen on a handheld touch screen equipped handheld device into a bounded touch control area set aside for touch screen control on the display screen and using the bounded touch control area for touch control commands;
 b. simulating by the touch screen user interface logic the bounded touch control area as an overlay over a part of the touch screen display for exclusive use as a touch control interface and does not display digital content from the device on the area;
 c. positioning by the touch screen user interface logic a window-cursor on the display screen that is displayed on the display content as a transparent window, and automatically varying the shape and size of the window-cursor to the format of the display content;
 d. using scroll navigation functions by the touch screen user interface logic on the bounded control area to scroll the display screen contents, until the desired display choice is inside the window cursor and activating the item in the window cursor by touching the control area, whereby enabling only the bounded control area for user interface functions of the handheld device and minimizing the bounded touch control area, for the entire touch screen to be then used for touch control.

18. The method of user interface as in claim 17, further comprising:
 a. making by the touch screen user interface logic the window-cursor shape, a square for icons, a rectangle for a list of items, a circle for graphical displays that are displayed on the display screen, and a highlight for webpage links and spaces;
 b. changing by the touch screen user interface logic the shape and size of the window based on the display contents.

19. The method as in claim 17, further comprising:
 a. maximizing by the user the display of bounded control area when the display screen has display of information and when the display screen contents requires user interface functions;
 b. switching by the touch screen user interface logic between using the bounded control area for user interface functions and the entire touch screen, based on user preference.

20. The method as in claim 17, further comprising:
 a. positioning by the touch screen user interface logic the bounded touch control area on any part of the display screen based on a user preference;
 b. segregating by the touch screen user interface logic the control area is into multiple touch control areas that may be used for functions of scroll, action, zoom, mode control, and home.

21. A system of touch screen user interface in a handheld device, comprising:
 a. a hop-cursor logic stored in a memory of the device and executing in a CPU of the device displays a window-cursor on an icon from a group of icons of, a grid item, a list item, a map area, a webpage link, and a blank-space in a document to highlight that icon;
 b. the hop-cursor logic automatically changes shape of the window-cursor to match the display contents from the group of, grid items, list items, a map, a webpage with links and a document with blank-spaces;
 c. a webpage cursor logic that detects a webpage display, for a link cursor hops from link to link and rests only on a link and highlights the link location by size on a web page when the cursor keys are scrolled, enabling a link to be quickly selected;
 d. the webpage cursor logic hops a space cursor from a blank space to a blank space and rests only on the blank space and highlights the blank space location on a web page when the cursor keys are scrolled, enabling a location on a webpage to be selected for enabling a scaling operation.

22. The system as in claim 21, further comprising:
a. the hop-cursor logic hops the window-cursor to rest on an icon, a list item, a map area, a webpage link and a document blank-space, when the window-cursor is scrolled
b. the hop-cursor logic adjusts the size of the window-cursor to match the scaling of the display contents.

23. The system as in claim 21, further comprising:
the webpage cursor logic switches back and forth from the display of the link cursor to display of the blank space cursor on a user action.

* * * * *